(12) United States Patent
Fang

(10) Patent No.: US 7,457,012 B2
(45) Date of Patent: Nov. 25, 2008

(54) DETECTING THE ALIGNMENT OF A DOCUMENT IN AN AUTOMATIC DOCUMENT FEEDER

(76) Inventor: Po-Hua Fang, 3F, No. 55, Aly. 16, Ln. 2, Kuang Fu St., YungHo City, Taipei (TW)

( * ) Notice: Subject to any disclaimer, the term of this patent is extended or adjusted under 35 U.S.C. 154(b) by 844 days.

(21) Appl. No.: 10/035,516

(22) Filed: Nov. 9, 2001

(65) Prior Publication Data
US 2003/0090056 A1 May 15, 2003

(51) Int. Cl.
*H04N 1/04* (2006.01)
(52) U.S. Cl. .................. 358/498; 358/496; 358/488; 358/486
(58) Field of Classification Search ............. 358/488, 358/486, 496, 498, 401, 474, 501, 505, 406, 358/504, 465, 466; 399/367, 371, 372, 395, 399/394, 16; 382/289, 296, 286, 287; 271/226, 271/255
See application file for complete search history.

(56) References Cited

U.S. PATENT DOCUMENTS

| | | | | | |
|---|---|---|---|---|---|
| 4,641,357 | A | * | 2/1987 | Satoh | 382/317 |
| 5,124,810 | A | * | 6/1992 | Seto | 358/406 |
| 5,149,977 | A | * | 9/1992 | Mita | 250/556 |
| 5,249,069 | A | * | 9/1993 | Petilli | 358/488 |
| 5,455,690 | A | * | 10/1995 | Ishikawa | 358/461 |
| 5,517,332 | A | * | 5/1996 | Barry et al. | 358/496 |
| 5,526,141 | A | * | 6/1996 | Ogura et al. | 358/496 |
| 5,661,571 | A | * | 8/1997 | Ijuin et al. | 358/471 |
| 5,673,126 | A | * | 9/1997 | Ando | 358/498 |
| 5,895,928 | A | * | 4/1999 | Kerschner | 250/559.37 |
| 5,912,448 | A | * | 6/1999 | Sevier et al. | 235/454 |
| 5,918,877 | A | * | 7/1999 | Takei et al. | 271/261 |
| 6,014,458 | A | * | 1/2000 | Wang | 382/176 |
| 6,064,778 | A | * | 5/2000 | Pasco et al. | 382/289 |
| 6,134,027 | A | * | 10/2000 | Lee | 358/474 |
| 6,301,022 | B1 | * | 10/2001 | Washio et al. | 358/488 |
| 6,340,984 | B1 | * | 1/2002 | Ui et al. | 347/139 |
| 6,718,071 | B2 | * | 4/2004 | Yoshida et al. | 382/289 |
| 6,771,842 | B1 | * | 8/2004 | Sakai et al. | 382/290 |
| 6,888,650 | B1 | * | 5/2005 | Mizubata et al. | 358/488 |
| 2007/0070451 | A1 | * | 3/2007 | Kazama et al. | 358/498 |

FOREIGN PATENT DOCUMENTS

| | | | | |
|---|---|---|---|---|
| JP | 55083368 | A | * | 6/1980 |
| JP | 11301883 | A | * | 11/1999 |
| TW | 395114 | B | | 6/2000 |

* cited by examiner

*Primary Examiner*—Cheukfan Lee
(74) *Attorney, Agent, or Firm*—Stolowitz Ford Cowger LLP

(57) ABSTRACT

A method of detecting the alignment of a document in an automatic document feeder including an optical scanner that has an automatic document feeder and a document. The automatic document feeder has a colored pattern layer corresponding to a scanning window of the optical scanner. The document has at least one side edge. When the document is being fed into the automatic document feeder, the side edge is just positioned between the scanning window and the colored pattern layer. When the automatic document feeder is switched on to feed in the document, a first image retrieval is made from the document placed on the scanning window. After the document is fed in by an appropriate length, a second image retrieval is made from the document placed on the scanning window. A slant value is calculated.

55 Claims, 18 Drawing Sheets

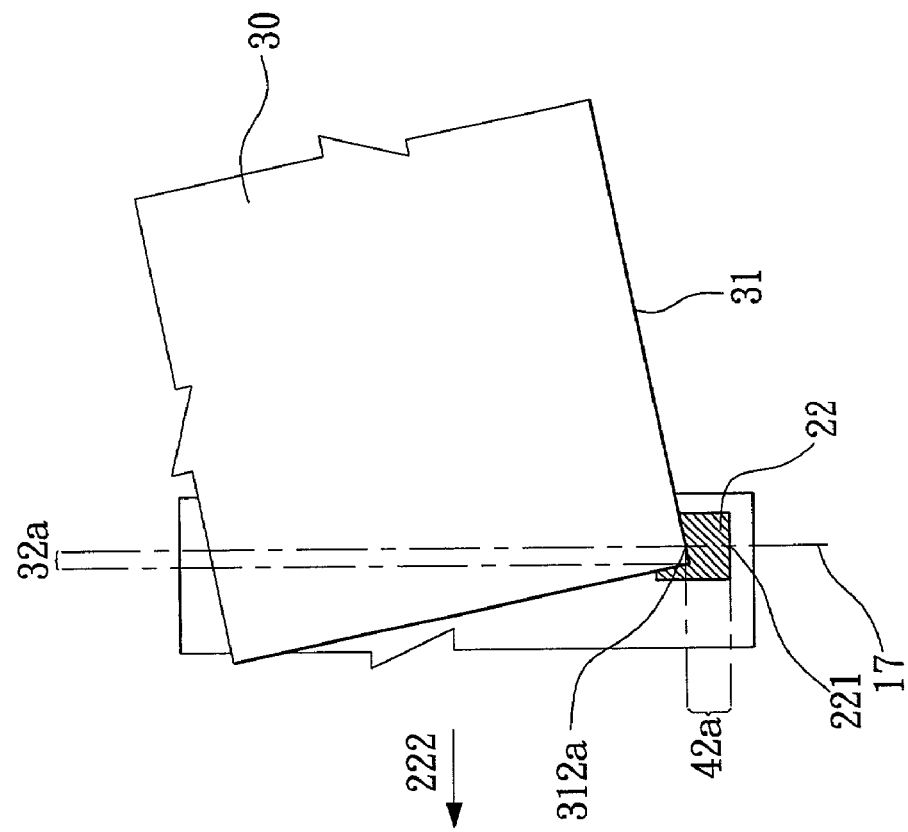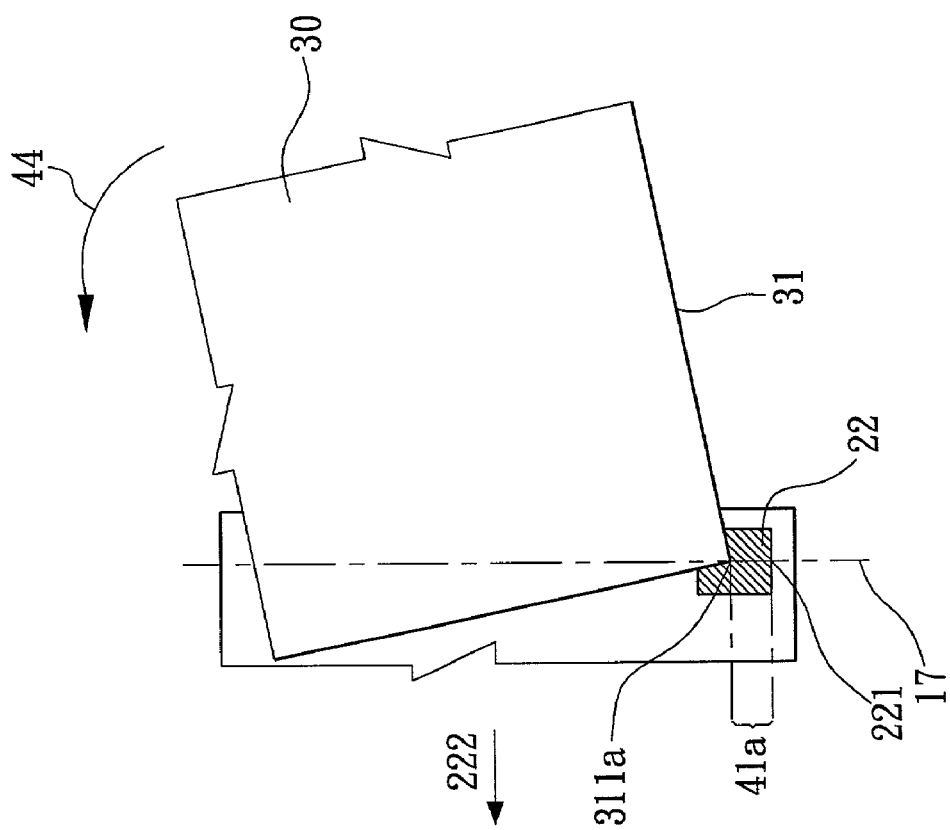
FIG. 6B
FIG. 6A

DETECTING THE ALIGNMENT OF A DOCUMENT IN AN AUTOMATIC DOCUMENT FEEDER

FIELD OF THE INVENTION

The present invention relates to an inspection method for a document, especially to a kind of inspection method for the document automatically fed from an automatic document feeder carried by an optical scanner.

BACKGROUND OF THE INVENTION

The times and the technologies are changing day by day. The relative technologies of electronic devices are progressing daily. The functions of electronic products are also enhanced abruptly. Relatively, the computer peripherals are expanded more and more quickly to provide the required convenience in daily life. The scanner is a commonly computer peripheral. The main function of the scanner is to retrieve an image of a scanned document and convert the retrieved image into electronic signals. And, the electronic signals are input to a computer to proceed image treatment.

Please refer to FIG. 1, which is an embodiment for a typical optical scanner 1 commonly seen in current market. A document window glass 15 for supporting a document 30 to be scanned is arranged on the upper side surface of a shell body 11 of the optical scanner 1. A scanning module 14 driven by a driving device 12 proceeds a linear motion along the direction of a guiding rod 13 inside the shell body 11 to execute an image scanning job to the document 30 placed on the document window glass 15.

Please refer to FIG. 2A to FIG. 2C, which are the execution embodiments for the automatic document feeder carried by an optical scanner commonly seen in current market. Wherein the automatic document feeder 2 is arranged on the upper side of the prior optical scanner 1 to provide scanning job for the automatically fed document 30. When processing the automatically document-feeding scanning, the scanning module 14 moves along the guiding rod 13 to a lower edge of the optical scanner 1 and is secured thereof. The document 30 is driven into the position of the scanning window 16 by the friction force of the rotation motion of the roller set 21. The motion of automatic document feeding and scanning is then completed.

When the document 30 is placed by the prior automatic document feeder 2, because the document 30 placed in slant way or the change of friction coefficient on the surface of the roller set 21 due to frequent usage, a slant is generated on the document driven by the non-uniform friction force applied by the roller 21. A slant document 30 will be scanned and an erroneous or mistaken scanned product is completed. Therefore, it must depend on personnel observe for changing or give up the scanning job of the automatic document feeder. So, it wastes lots of human power, time and material means. Above-mentioned problems are really needed to be solved among persons or industries to reduce the cost paid by the person or society and promote the industrial competition abilities of the country. Therefore, the break-through and solution for this problem is really urgent.

To break-through and solve the above problem, several relative makers proposed that a plurality of black-line-patterns be arranged on the automatic document feeder. Please refer to FIG. 3A to FIG. 3F, which show that the automatic document feeder 2 has plural black-line-patterns 23 of left- and-right symmetry corresponding to the scanning window 16 of the optical scanner 1. The automatic document feeder 2 feeds the document 30 in. After reading the image variation of the black line patterns 23, the time is counted by a timer (not shown in the drawing) that is set with a preset value, through an appropriate time, the document 30 is detected. When the document 30 is fed in a slant way, only one side of the black line patterns is blocked by the document 30, so the motion will be stopped and an alarm is set off. When the document 30 is fed in normal way, two sides of the patterns will all be blocked by the document 30, a second detection will be executed for ensuring that no error happened and then a scanning is executed.

But to solve the above problem, not only are complicated detection steps required, but also an increase of accessories for scanners is needed It is also impossible to accurately detect the slant quantity of the document. Since a single arrangement is only for a single machine, so for various scanners, a wide availability can not be obtained. Therefore, the prior solution can not appropriately and completely fulfill the requirement for the manufacturing industries. The problem still can not get a suitable solution that is urgently required by the manufacturing industries to promote the technology.

SUMMARY OF THE INVENTION

The main object of the present invention is to provide an inspection method for optical scanner with automatic document feeding. The method may detect and calculate the slant quantity of a document fed by the automatic document feeder for surely reaching the function that the automatic document feeder of optical scanner won't generate slant scanning.

To fulfill above-mentioned objects, a method for detecting the alignment of document in an automatic document feeder, comprising the steps of:

Step A: providing an optical scanner having an automatic document feeder and a document. The automatic document feeder has a colored pattern layer corresponding to a scanning window of the optical scanner. The document has at least one side edge. When the document is fed into the automatic document feeder, the side edge is just located between the scanning window and the colored pattern layer.

Step B: actuating the automatic document feeder to feed in the document, a first image retrieval is made for the document placed on the scanning window.

Step C: an appropriate length of the document is fed in.

Step D: a second image retrieval is made for the document placed on the scanning window.

Step E: a slant value is calculated out from the result of comparing the first image retrieval and the second image retrieval.

Wherein for a preference of the present invention, after the step E, comprising the steps of:

Step F: comparing the slant value with a preset value.

Step G: if the slant value is smaller than the preset value, then scanning the document is begun.

Step H: if the slant value is larger than the preset value, then the motion is stopped.

For your esteemed committee to further understand and recognize the present invention, a detailed description in matching with corresponding drawings are presented as following.

BRIEF DESCRIPTION OF THE DRAWINGS

FIG. 6A is an illustration for the second preferable embodiment for the first image retrieval of the present invention detecting the slant of a document.

FIG. 6B is an illustration for the second preferable embodiment for the second image retrieval of the present invention detecting the slant of a document.

DETAILED DESCRIPTION OF THE PREFERRED EMBODIMENTS

The main characteristic of the inspection method for an optical scanner with automatic document feeding is that a colored pattern layer of a color different from that of the operation document is provided in the automatic document feeder corresponding to the optical scanner for providing the fed document to block the colored pattern layer and reach a function of detecting a slant value of the document.

Figure 1:
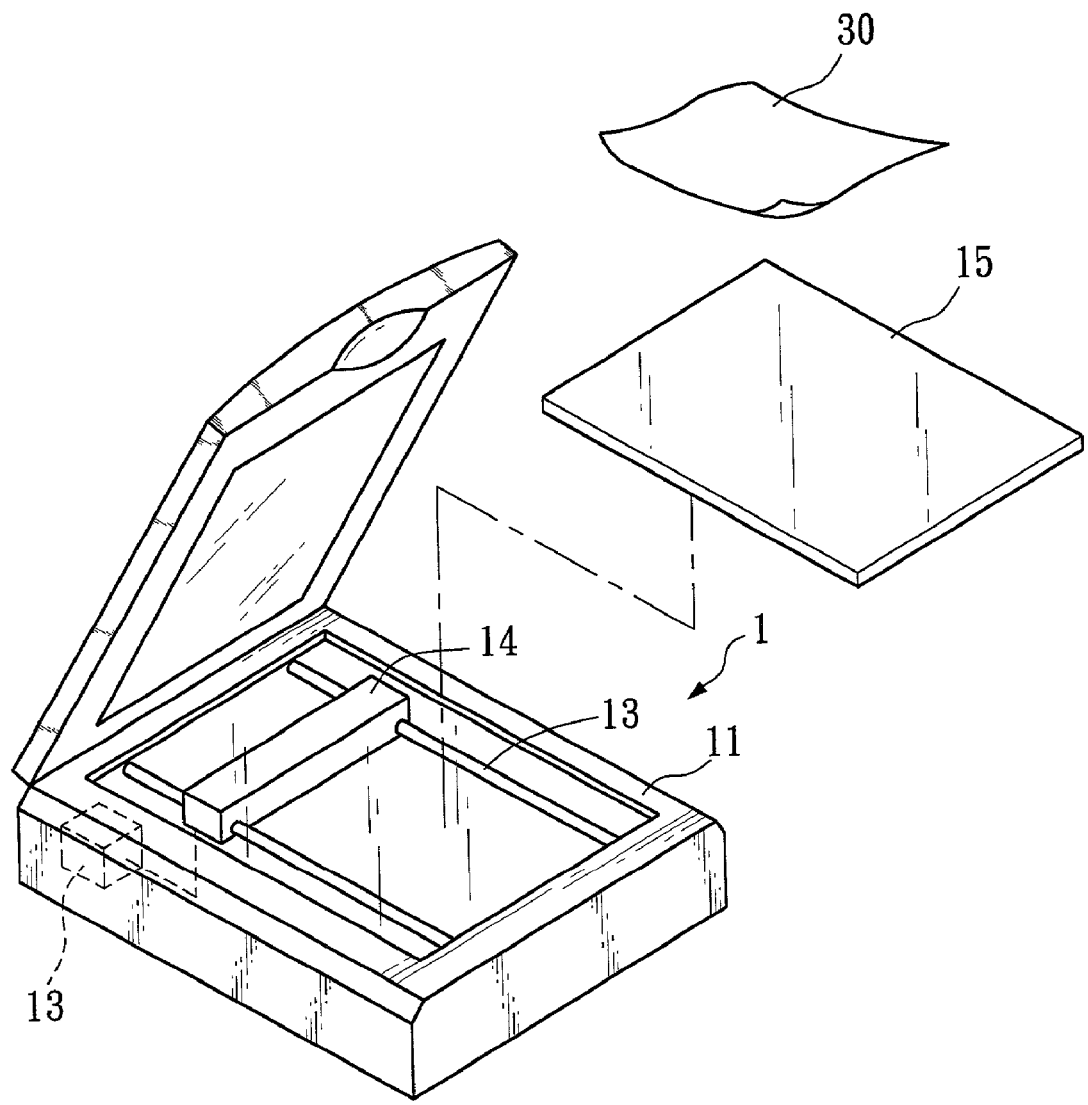
FIG. 1 is an execution illustration for prior optical scanner.
Figure 2A:
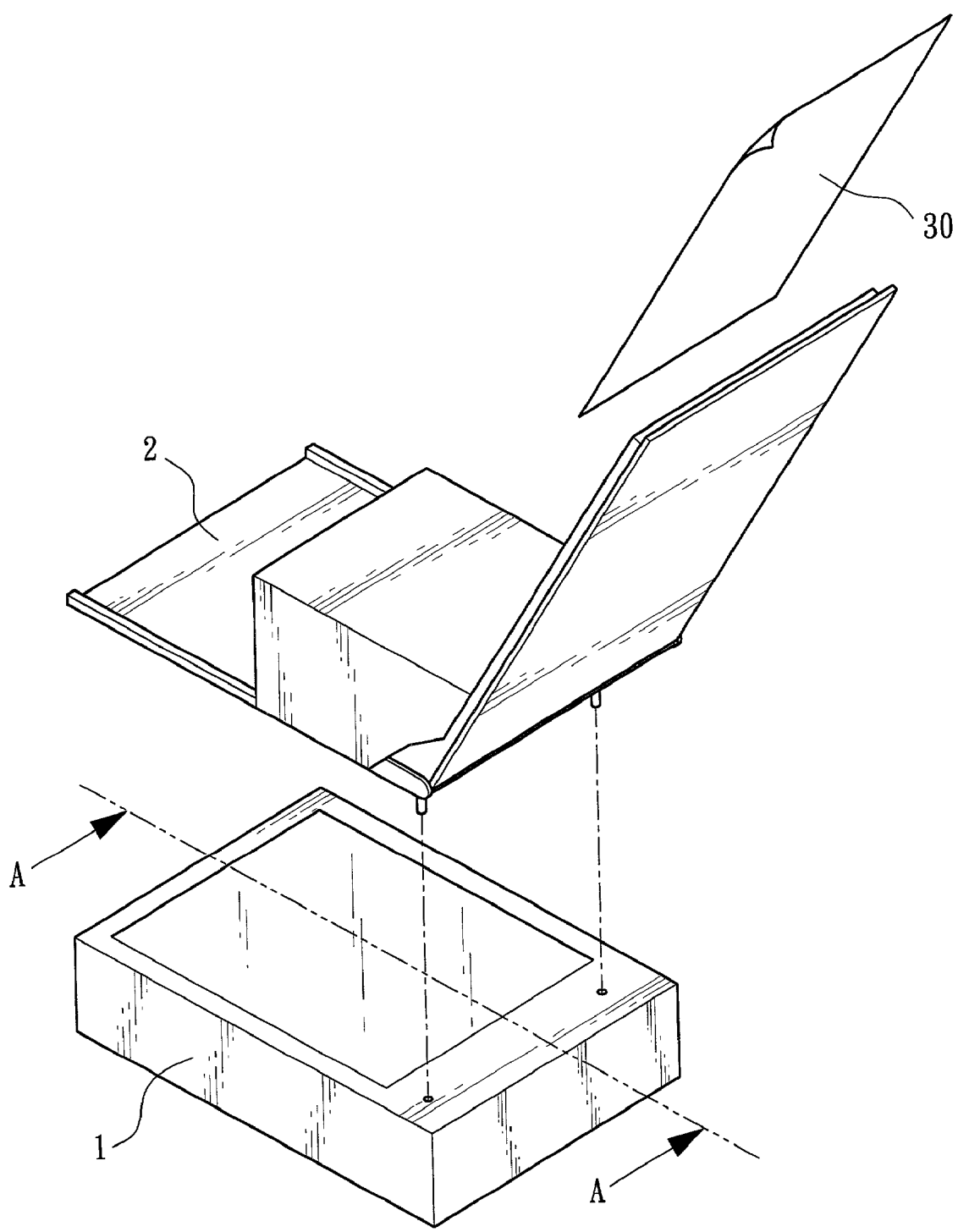
FIG. 2A is an execution illustration for a three-dimensional structure of an automatic document feeder carried in prior optical scanner.
Figure 2B:
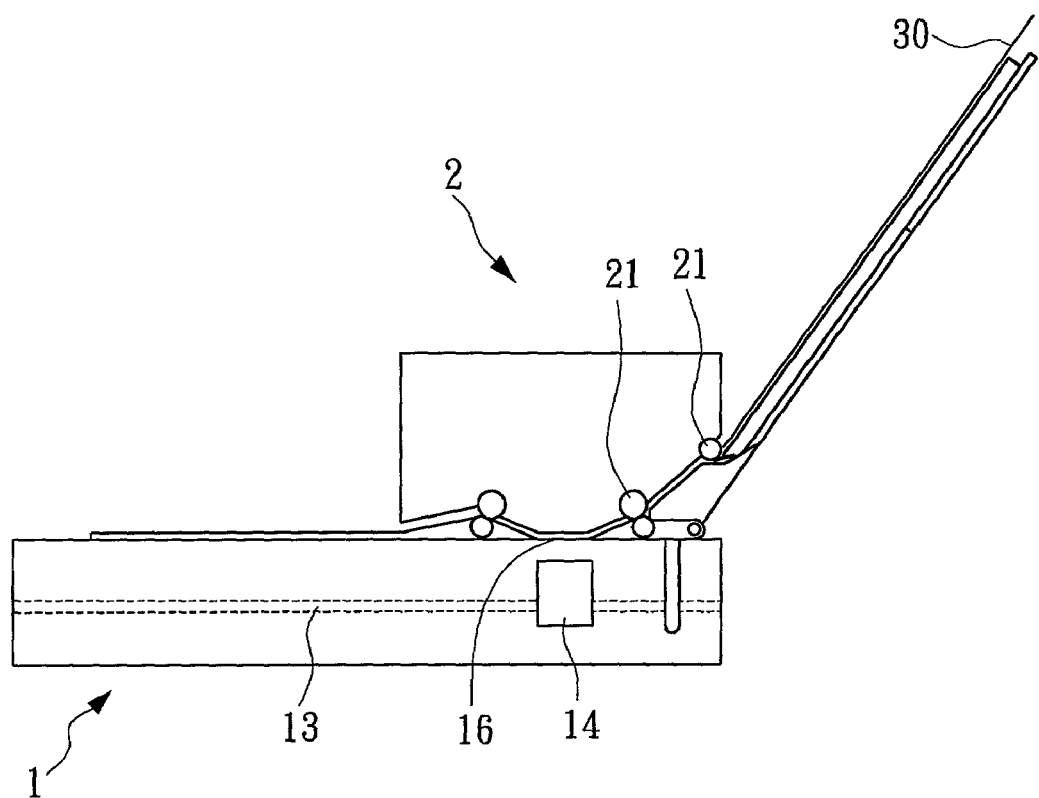
FIG. 2B is an execution illustration for an "A-A" cross-sectional structure of an automatic document feeder carried in prior optical scanner.
Figure 2C:
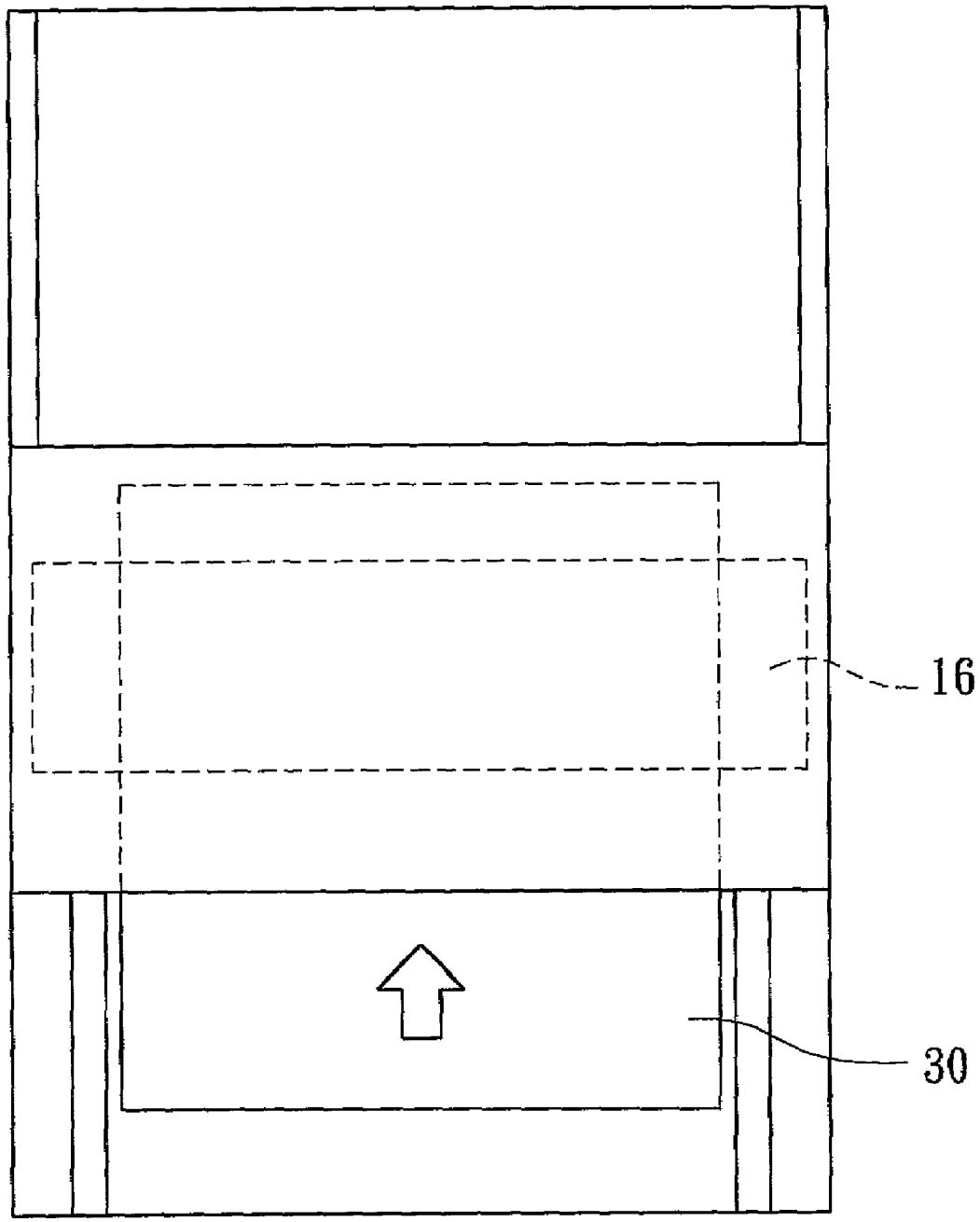
FIG. 2C is an upper view for an automatic document feeder carried in prior optical scanner.
Figure 3A:
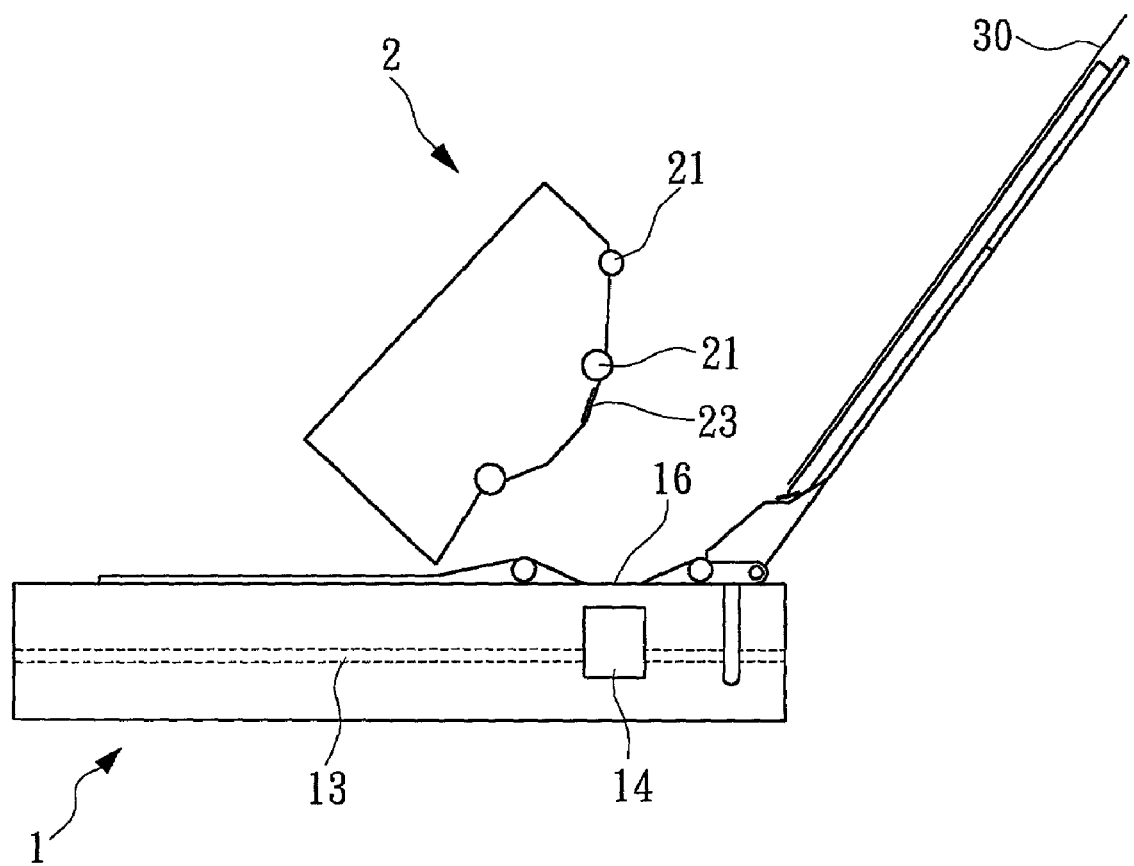
FIG. 3A is a cross-sectional structure illustration for the embodiment of plural black-line-patterns provided in the prior automatic document feeder.
Figure 3B:
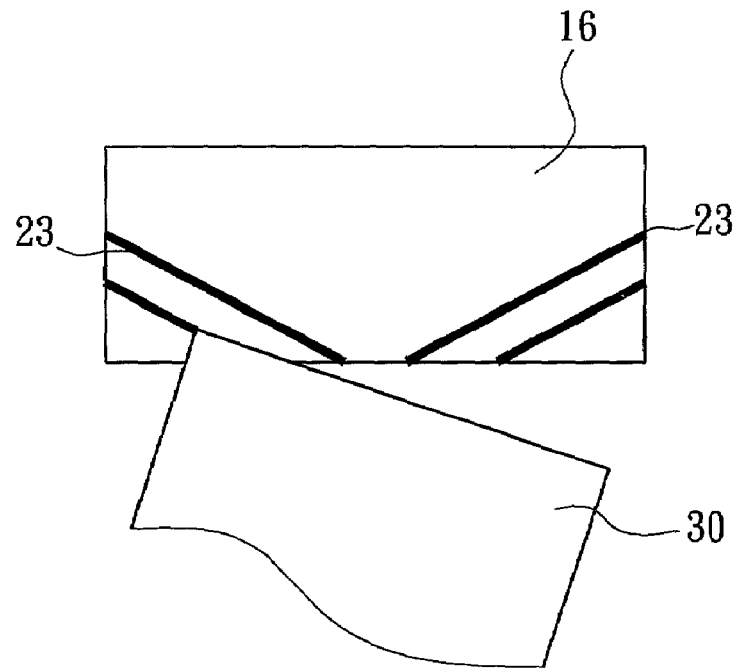
FIG. 3B is an upper view illustration before the prior plural black-line-patterns executing slant document feeding.
Figure 3C:
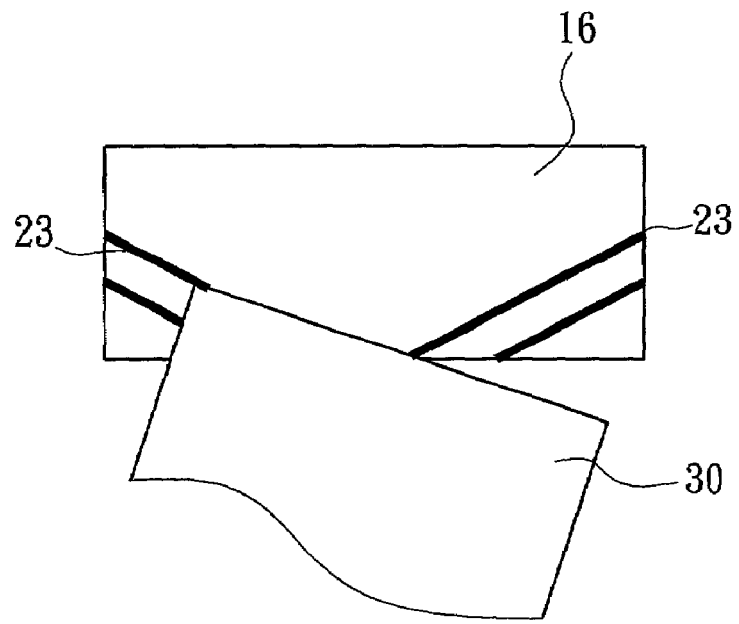
FIG. 3C is an upper view illustration after the prior plural black-line-patterns executing slant document feeding.
Figure 3D:
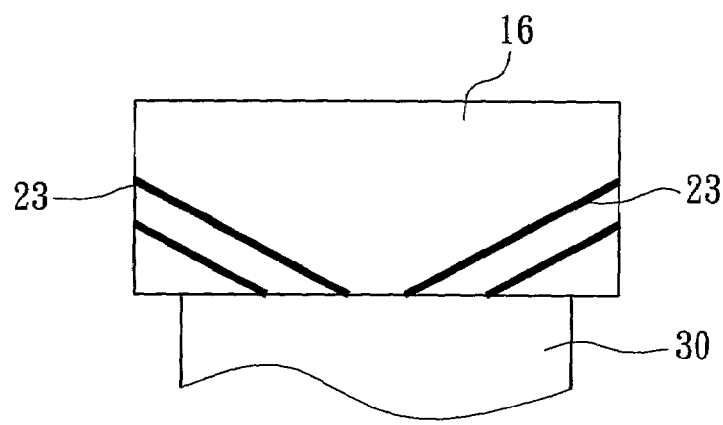
FIG. 3D is an upper view illustration before the prior plural black-line-patterns executing normal document feeding.
Figure 3E:
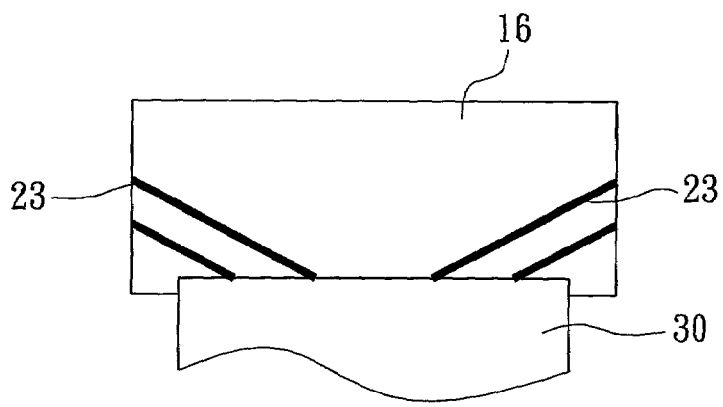
FIG. 3E is an upper view illustration for the first execution of normal document feeding for the prior plural black-line-patterns.
Figure 3F:
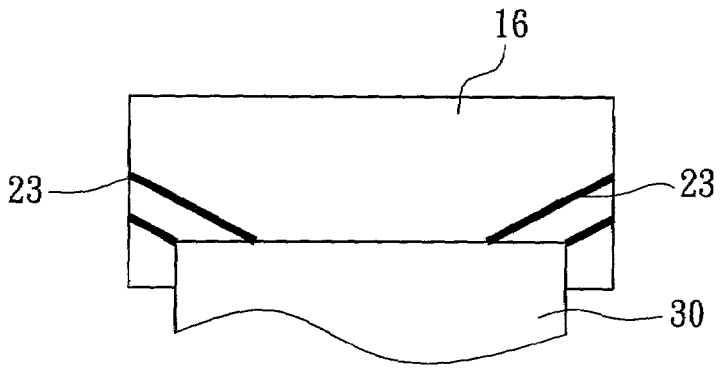
FIG. 3F is an upper view illustration for the second execution of normal document feeding for the prior plural black-line-patterns.
Figure 4A:
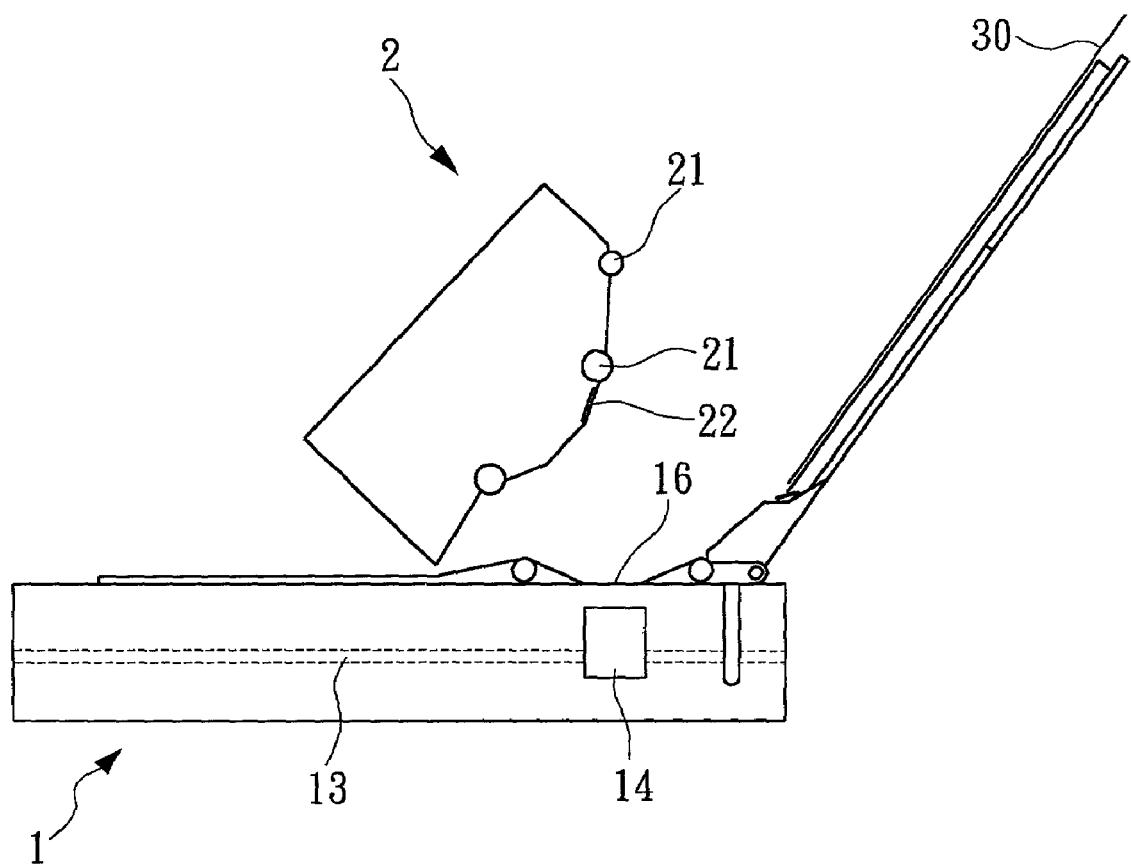
FIG. 4A is a cross-sectional structure illustration for a preferable embodiment for a colored-pattern-layer arranged in the automatic document-feeder of the present invention.
Figure 4B:
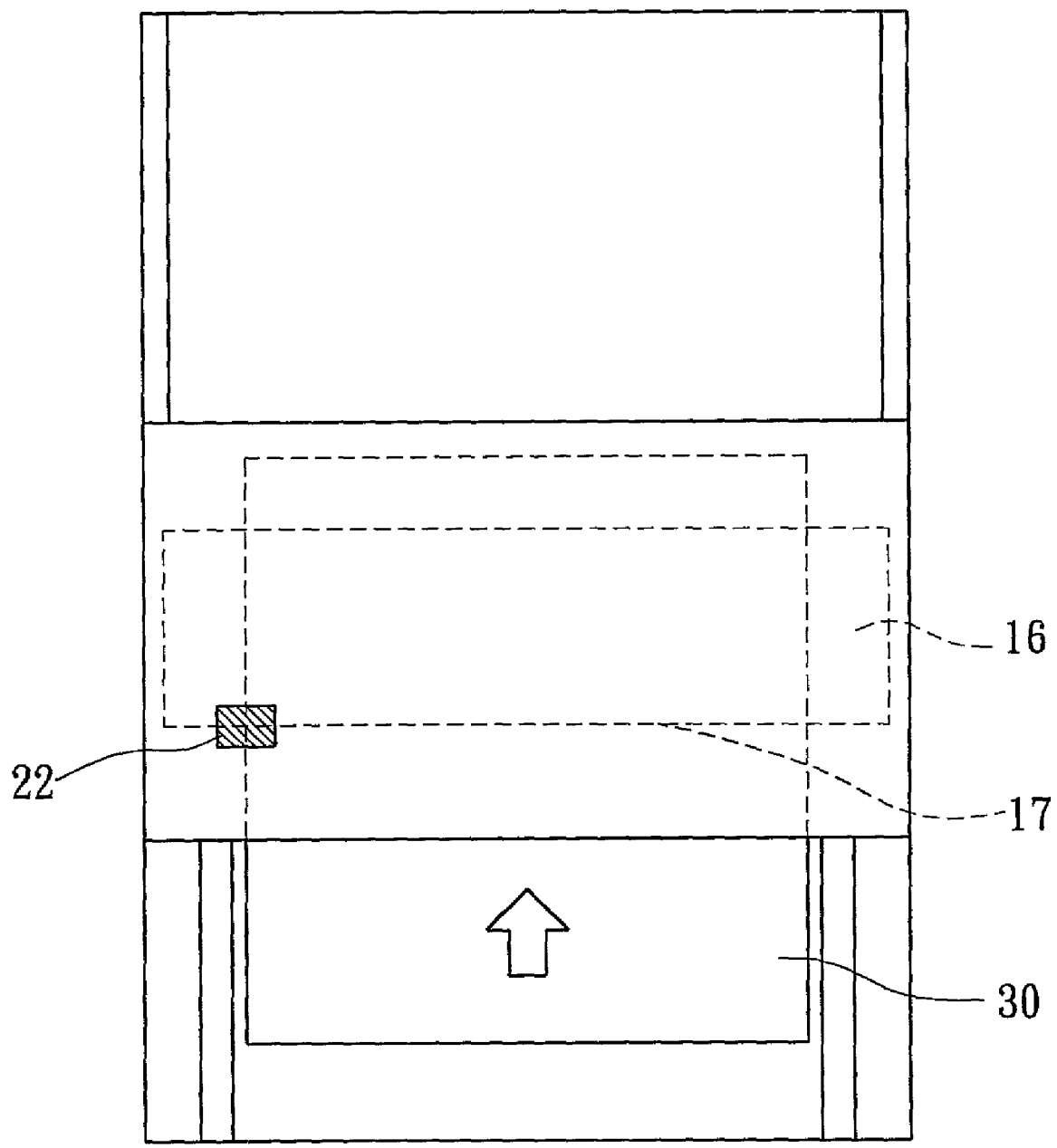
FIG. 4B is an upper view illustration for the first embodiment of a colored-pattern-layer position provided in present invention.

Please refer to FIG. 4A, which is a cross-sectional structure illustration for a preferred embodiment for a colored-pattern-layer provided in an automatic document feeder of the present invention. Wherein, the prior optical scanner 1 has an automatic document feeder 2 by a manner of carrying to provide automatic scanning operation for the automatically fed document 30. While in a preferred embodiment of the present invention, a colored pattern layer 22 is arranged at the automatic document feeder 2 corresponding to the scanning window 16 of the optical scanner 1. The color of the colored pattern layer 22 is different from the operation color of the document 30. When the document 30 is fed into the automatic document feeder 2, the document 30 is just positioned between the scanning window 16 and the colored pattern layer 22.

Figure 4C:
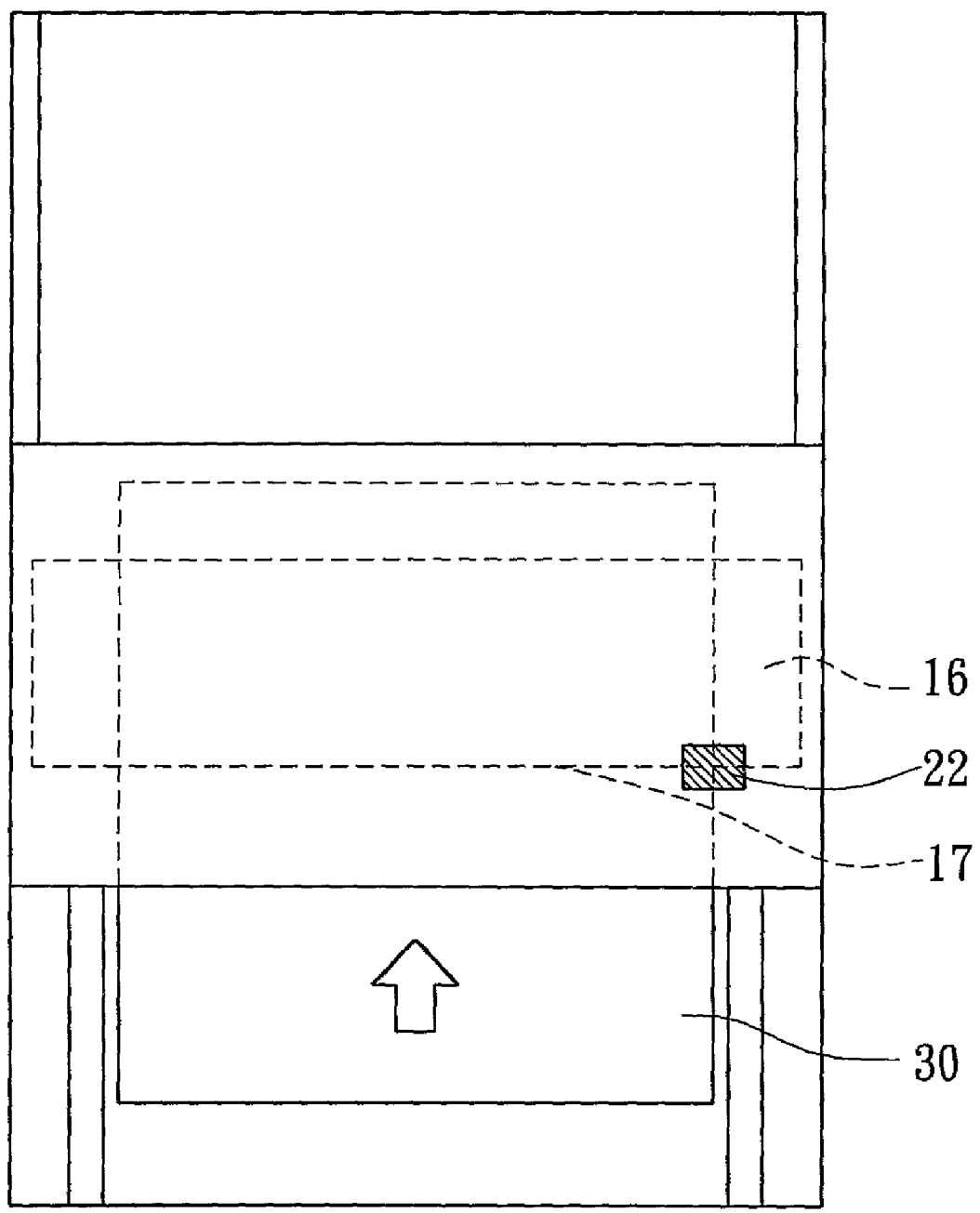
FIG. 4C is an upper view illustration for the second embodiment of a colored-pattern-layer position provided in present invention.
Figure 4D:
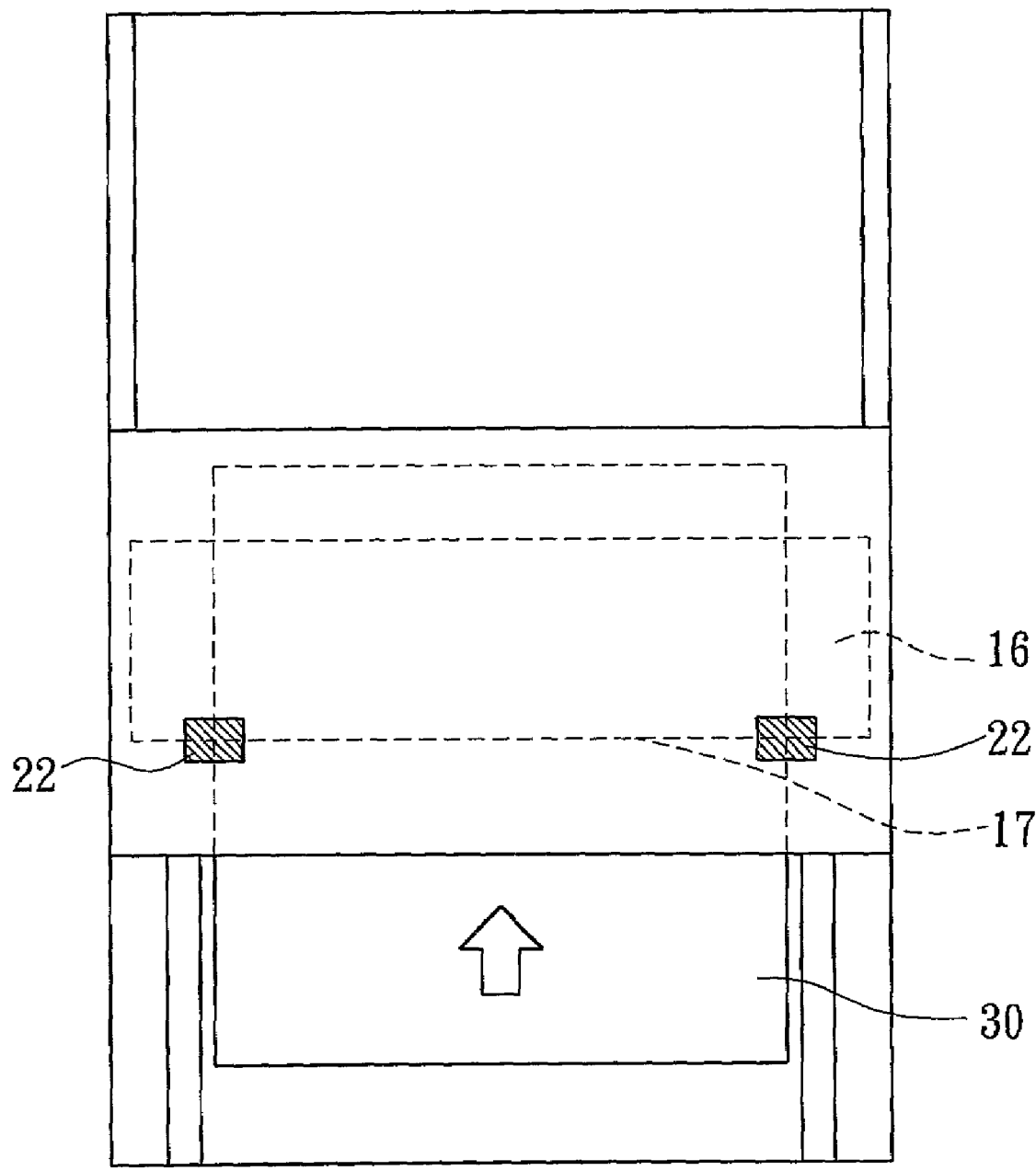
FIG. 4D is an upper view illustration for the third embodiment of a colored-pattern-layer position provided in present invention.
Figure 4E:
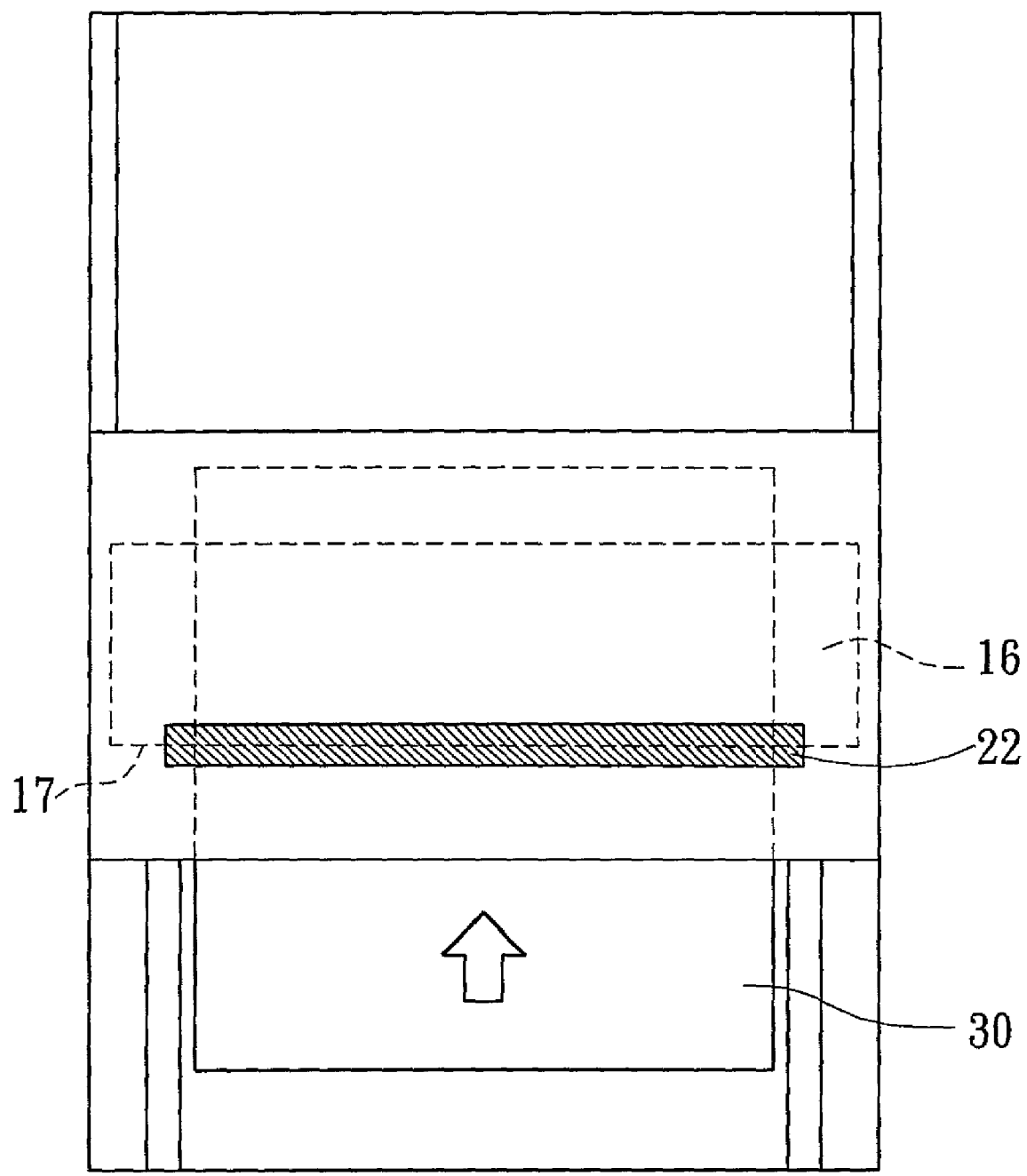
FIG. 4E is an upper view illustration for the fourth embodiment of a colored-pattern-layer position provided in present invention.
Figure 4F:
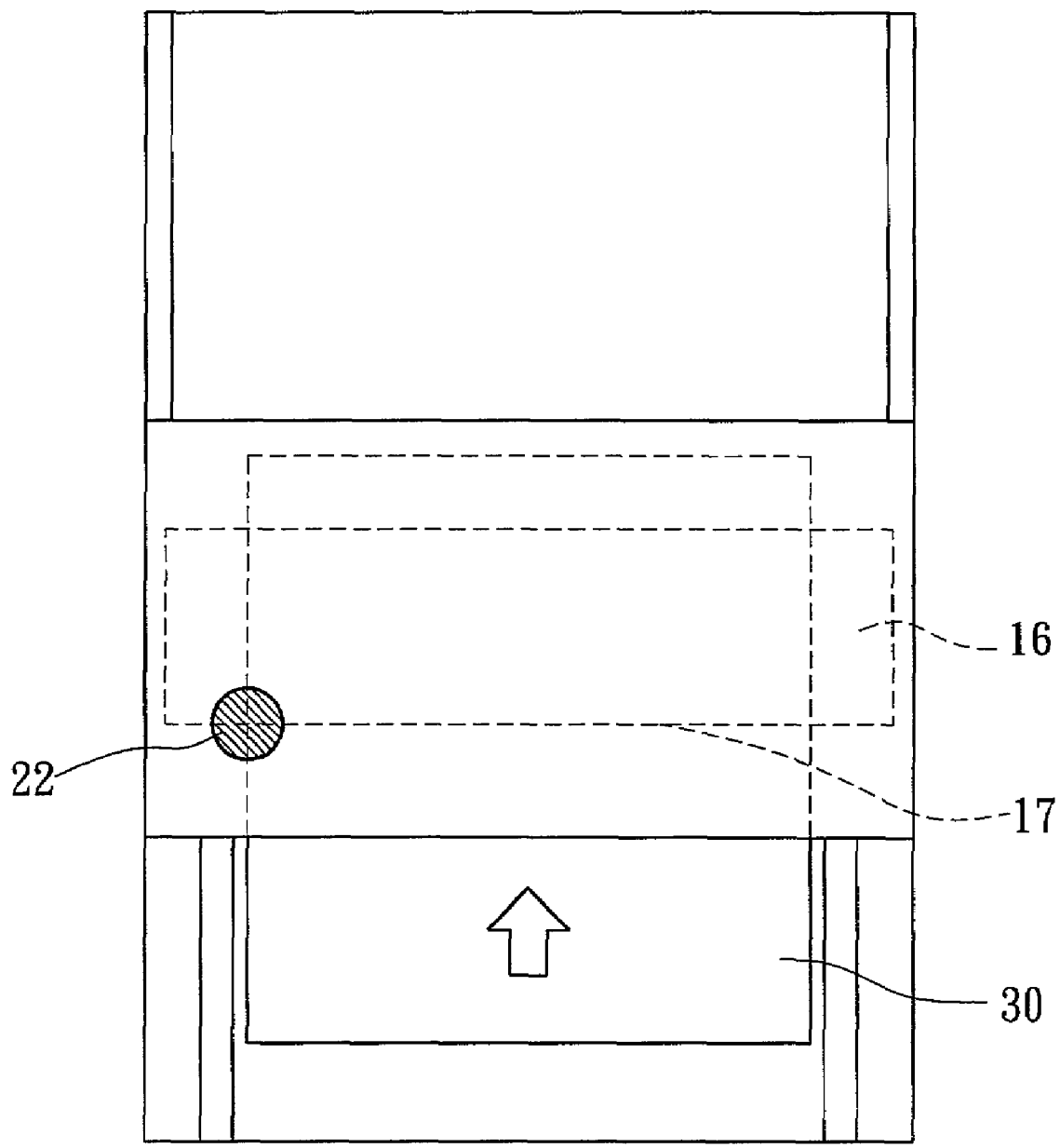
FIG. 4F is an upper view illustration for the fifth embodiment of a colored-pattern-layer position provided in present invention.

Please refer to FIG. 4B to FIG. 4F, which show the upper illustrations for preferred embodiments of the present invention provided with colored pattern layer. Wherein, the referable colored pattern layer 22 in present invention is a rectangular block arranged on a scan line 17 positioned in the scanning window 16. Referring to FIG. 4E, the width of the layer 22 is wider than that of the document 30. The arrangement of the colored pattern layer 22 may be positioned at the right side position of the scan line 17 (as shown in FIG. 4C). The transformation of such technique may be that a colored pattern layer 22 (as shown in FIG. 4D) is arranged at each left position and right position of the scan line 17. It is easily known that the arrangement of the colored pattern layer 22 is a long stripe that covers the entire scan line 17 (as shown in FIG. 4E) to also reach the function of the present invention, Of course, the shapes of the colored pattern layer could be also circular shape (as shown in FIG. 4F) or other shapes. So, the transformation can be easily executed according to the aforementioned description of the present invention, which is still within the technical scope of the present invention, and further detailed description is not repetitiously presented here.

Please refer to FIG. 5A through FIG. 7B, which show the illustrations of preferred embodiments with first image retrieval and second image retrieval for the document's inspection of the present invention. FIG. 5A through FIG. 6B depict a method of the arrangement of the colored pattern layer 22, when it is to the left of the scan line 22. The document 30 has at least a side 31. The side 31 is parallel to the feeding direction 222, of which the document 30 is fed into the automatic document feeder 2.

Figure 5A:
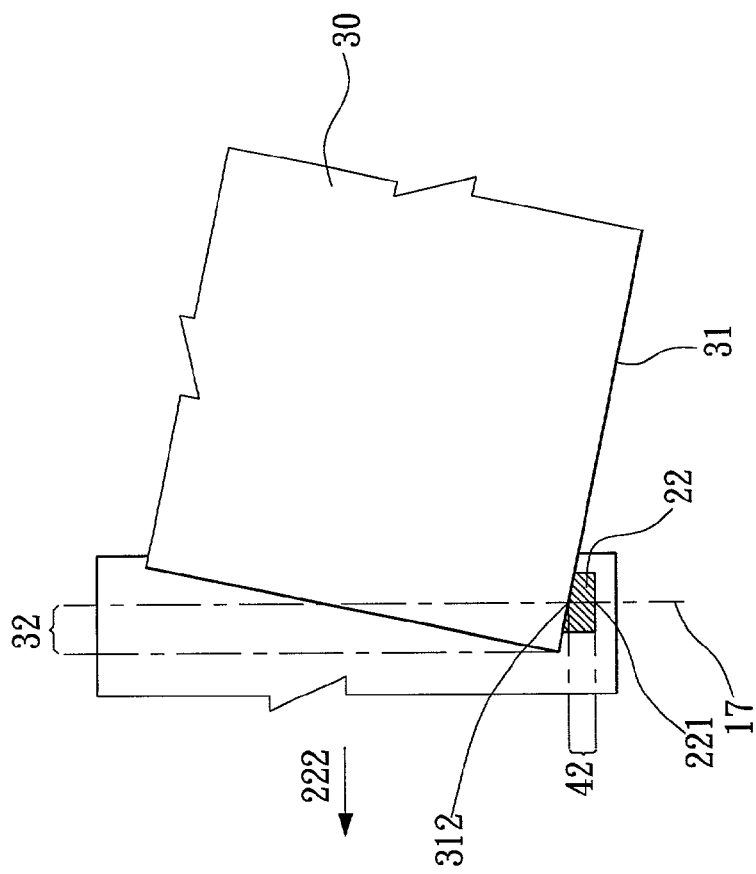
FIG. 5A is an illustration for the first preferable embodiment for the first image retrieval of the present invention detecting the slant of a document.
Figure 5B:
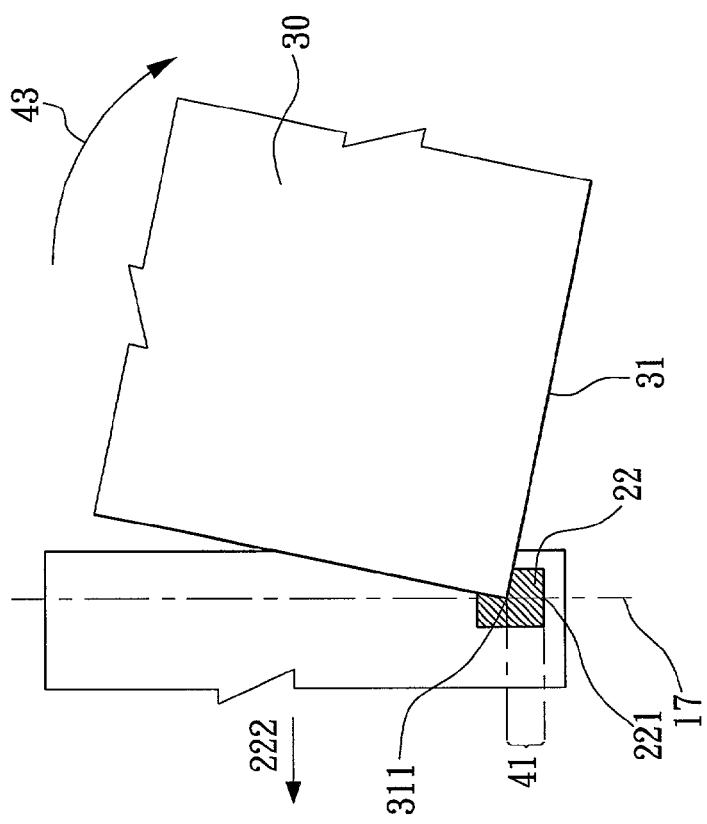
FIG. 5B is an illustration for the first preferable embodiment for the second image retrieval of the present invention detecting the slant of a document.

Please refer to FIG. 5A and FIG. 5B. When the document 30 is automatically fed in initially, if the document 30 is slanted to the first direction (clock-wise direction) 43, the side 31 will move onto the scan line 17 firstly, and intercross with the scan line 17 to form a first side point 311. At this time, the first image retrieval is a first distance 41 detected between the first side point 311 and a reference point 221 positioned at the colored pattern layer 22 Wherein, the reference point 221 is positioned at an appropriate fixing point on the scan line 17. In a preferable embodiment of the present invention, the reference point 221 is the fixing point on the most outer or inner side. Of course, the reference point 221 may also be another fixing point that is provided for easy detection. These sorts of transformations may be executed easily according to the aforementioned description of the present invention, therefore they are not repetitiously described here any more. Afterwards, the document is fed in for an appropriate length 32, wherein the side 31 will intercross with the cross line 17 to form a second side point 312. At this time, the second image retrieval is a second distance 42 detected between the second side point 312 and the reference point 221.

Please refer to FIG. 6A and FIG. 6B. When the document is moving in slant way to the second direction (i.e., the counter clock-wise direction) 44, the side 31 will move onto the scan line 17 firstly, and intercross with the scan line 17 to form a first side point 311a. At this time, the first image retrieval is a first distance 41a detected between the first side point 311a and the reference point 221. The document 30 is further fed in for an appropriate length 32a. The side 31 will intercross with the scan line 17 to form a second side point 312a. At this time, the second image retrieval is a second distance 42a detected between the second side point 312a and the reference point 221.

A value of difference will be calculated by comparing the difference value of the first distance 41 and the second distance 42 in FIG. 5A and FIG. 5B with the difference value of the first distance 41a and the second distance 42a in FIG. 6A and FIG. 6B.

Figure 7B:
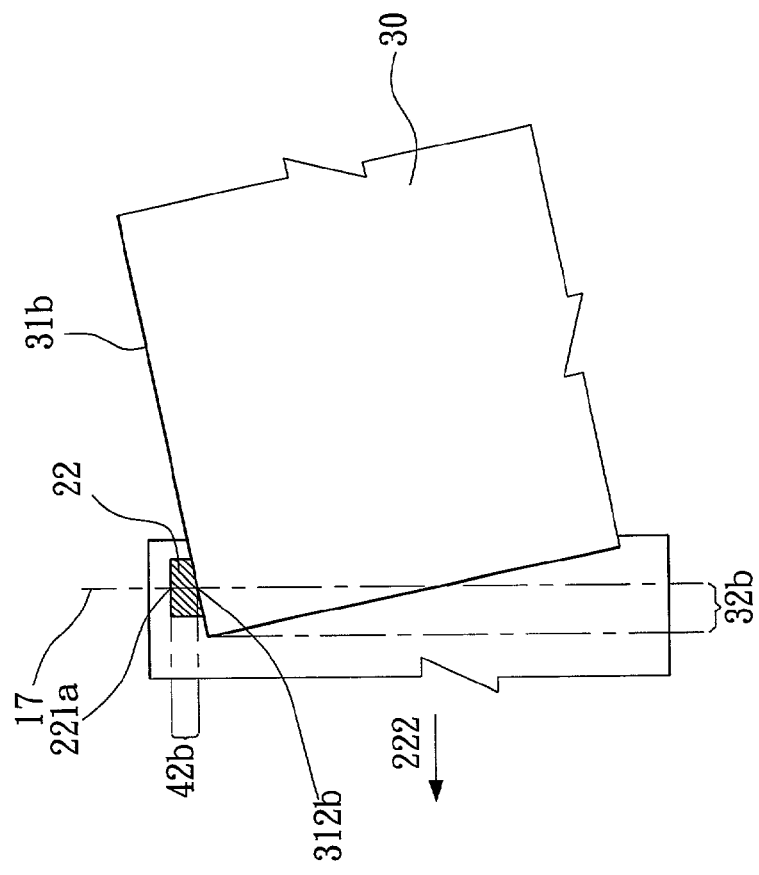
FIG. 7B is an illustration for the third preferable embodiment for the second image retrieval of the present invention detecting the slant of a document.
Figure 7A:
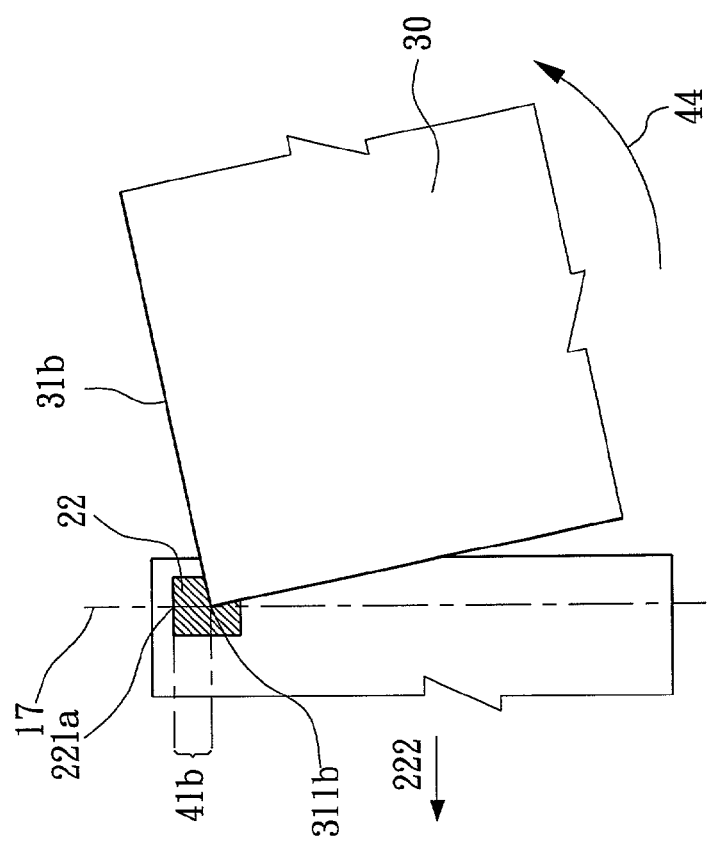
FIG. 7A is an illustration for the third preferable embodiment for the first image retrieval of the present invention detecting the slant of a document.

FIG. 7A and FIG. 7B is the detecting method that the arrangement of the colored pattern layer 22 is at the right position of the scan line 17. The document 30 has at least a side 31b. The side 31b is parallel to the feeding direction 222, of which the document 30 is fed into the automatic document feeder 2. When the document 30 is automatically fed in initially, and the document 30 is slanted to the second direction (i.e., the counter clock-wise direction) 44, the side 31b will move onto the scan line 17 firstly, and intercross with the scan line 17 to form a first side point 311b. At this time, the first image retrieval is a first distance 41b detected between the fist side point 311 b and the reference point 221a. The document 30 is further fed in for an appropriate length 32b. The side 31b will intercross with the scan line 17 to form a second side point 312b. At this time, the second image retrieval is a second distance 42b detected between the second side point 312b and the reference point 221a. In the document 30 is slanted to the first direction (i.e., clock-wise direction) 43, an identical method of detection is also applied. When a colored pattern layer 22 is provided respectively at the left and right positions of the scan line 17 and the arrangement of the colored pattern layer 22 is a stripe that covers the entire scan line 17 or an arrangement of circular shape or other shapes, a function of the present invention may also be executed easily. So, according to the aforementioned description of the present invention, these sorts of transformation may executed easily, and still are within the technical scope of the present invention, therefore a detailed description is not repetitiously presented here.

Of course, when the document 30 is slanted to the first direction (i.e., clock-wise direction) 43, an identical method of detection is also applied. When a colored pattern layer 22 is provided respectively at the left and right positions of the scan line 17 and the arrangement of the colored pattern layer 22 is a stripe that covers the entire scan line 17 or an arrangement of circular shape or other shapes, a function of the present invention may also be executed easily. So, according to the aforementioned description of the present invention, these sorts of transformation may executed easily, and still are within the technical scope of the present invention, therefore a detailed description is not repetitiously presented here.

From the illustrations from FIG. 5A through FIG. 7B, a slant value of the document 30 is further calculated out from the first image retrieval and the second image retrieval. The slant value is a ratio of the difference value between the first distance 41 and the second distance 42 versus the appropriate feeding length 32 (i.e., slant value=(the first distance 41–the second distance 42)/feeding length 32). Since the calculated ratio is a radius degree of sine angle, so the slant angle may be calculated from this equation.

Figure 8:
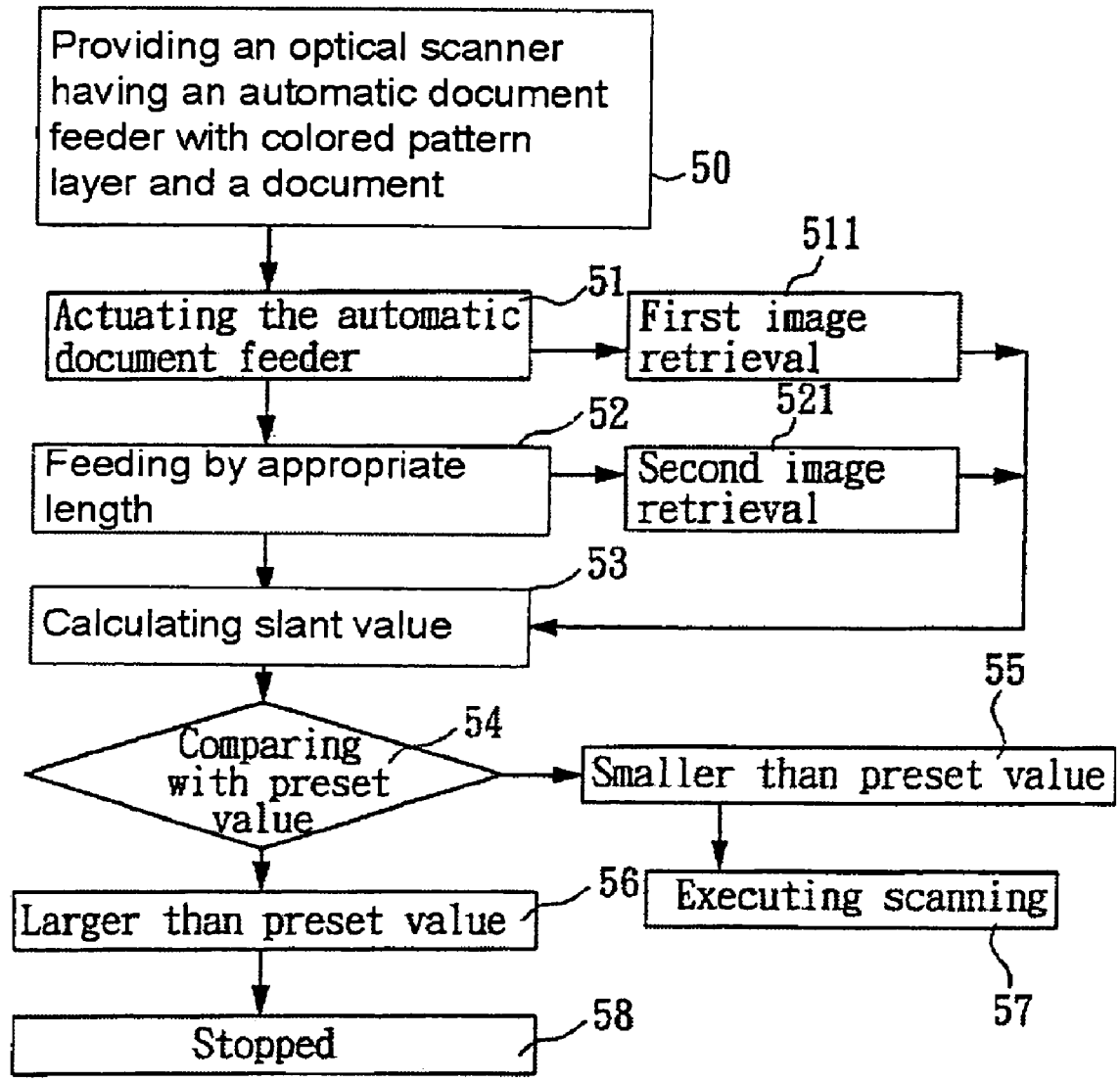
FIG. 8 is a flow chart illustration for the first preferable embodiment for the method of the present invention to test slant for an optical scanner provided with an automatic document feeder.
Figure 9:
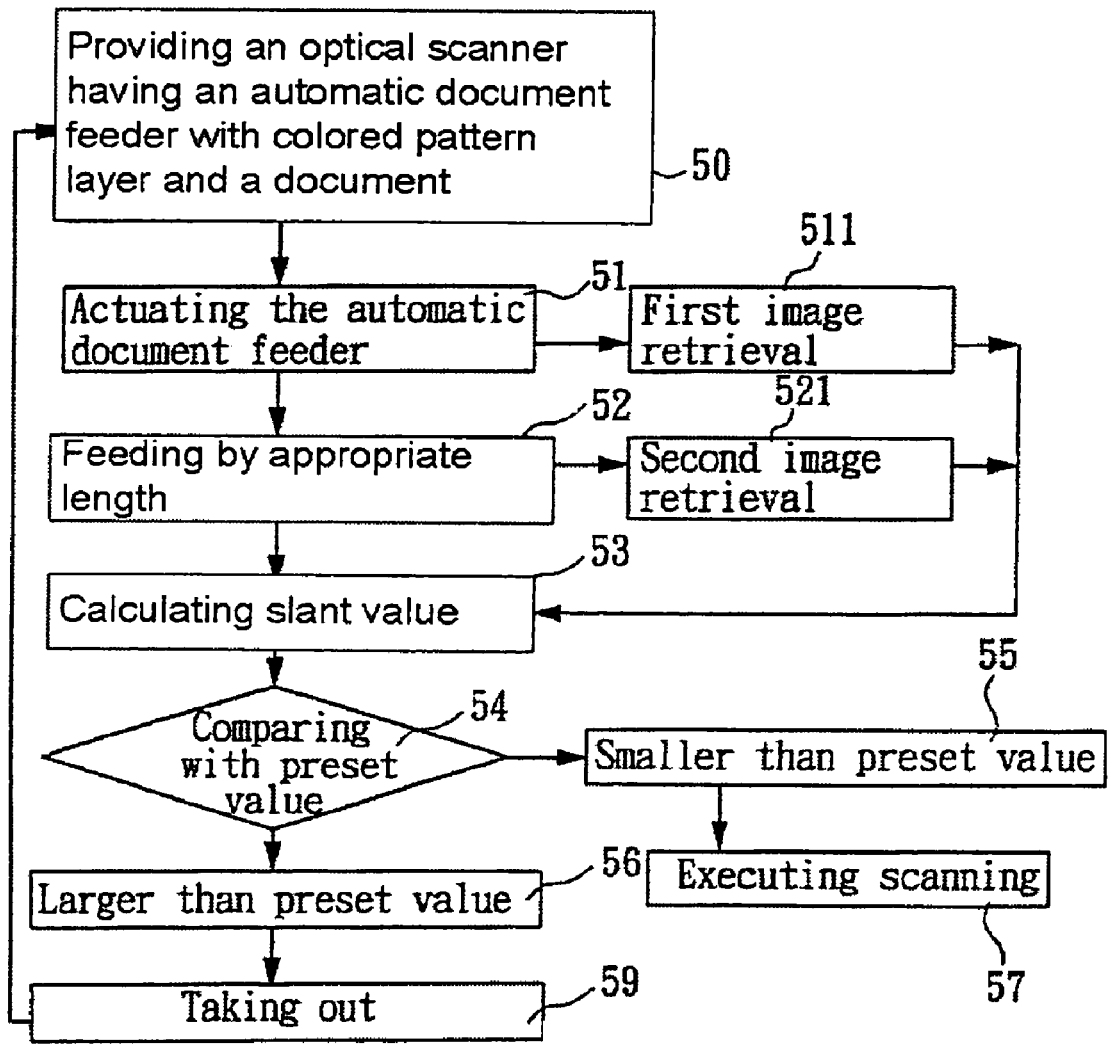
FIG. 9 is a flow chart illustration for the second preferable embodiment for the method of the present invention to test slant for an optical scanner provided with an automatic document feeder.

Please refer to FIG. 8 and FIG. 9, which are the flow chart illustrations for the preferable embodiments for the method of the present invention to test slant for an optical scanner provided with automatic document feeder. Wherein, a slant-testing method for optical scanner with automatic document feeder of the present invention, comprising following steps:

Step A: providing an optical scanner having an automatic document feeder and a document 50. The automatic document feeder has a colored pattern layer that has a color different from that of the document in corresponding to a scanning window of the optical scanner. The document has at least one side edge that is parallel to the feeding direction of the document fed into the automatic document feeder. When the document is fed into the automatic document feeder, the side edge is just located between the scanning window and the colored pattern layer.

Step B: Actuating the automatic document feeder to feed in the document 51, a first image retrieval 511 is made for the document placed on the scanning window. Wherein, the first image retrieval is a first distance detected between the side placed on the scan line of the scanning window and a reference point positioned at the colored pattern layer. While the reference point is a fixing point of the colored pattern layer located at the most inner or outer side of the scan line, of course, the reference point may also be another fixing point provided for convenient detection.

Step C: An appropriate length 52 of the document is fed in. The appropriate length is a fixing length through calculating such that sufficiently provides judgment for the slant angle.

Step D: A second image retrieval is made for the document placed on the scanning window. Wherein, the second image retrieval is a second distance detected between the side of the scan line and the reference point after the appropriate length is fed.

Step E: A slant value 53 is calculated out from the result of comparing the first image retrieval and the second image retrieval. The slant value 53 is a ratio calculated by an electronic calculation device from the difference value between the first distance and the second distance versus the appropriate length. Since the calculated ratio is a radius degree of sine angle, so the slant angle may be calculated out. The electronic calculation device is a calculator or calculation software program in the computer executing scanning.

In a preferable embodiment of the present invention, following steps are further included after the step E.

Step F: Comparing the slant value with a preset value 54 that has been tested for providing the document fed appropriately into the scanning area. If the slant value is smaller than the preset value 55, then scanning the document is begun 57; if the slant value is larger than the preset value 56, then the motion is stopped 58.

In summary, when the comparing result is that the slant value is larger than the preset value, it can facilitate the automatic document feeder to set off an alarm for notifying the operation personnel. Or, when the comparing result is that the slant value is larger than the preset value 56, the automatic document feeder is designed to release the document automatically or take out the document manually 59. Afterwards, the document is placed in from beginning and the continuous steps of detection after the Step B are executed in the same manner.

What is claimed is:

1. A method for detecting an alignment of a document having a side edge in an automatic document feeder, the automatic document feeder included in an optical scanner having a scanning window, the method comprising:
    actuating the automatic document feeder to feed in the document to a first position, wherein a portion of the side edge of the document in the first position is defined by the scanning window and a colored pattern layer in the scanning window;
    capturing a first image of the document while the document is in said first position;
    feeding the document a feeding length that is less than a total length of the document to a second position;
    capturing a second image of the document while said document is in said second position; and
    calculating a slant value by comparing the first image with the second image.

2. The method of claim 1, wherein a color of the colored pattern layer is different from that of the document.

3. The method of claim 1, wherein the side edge is substantially parallel to a feeding direction of the document.

4. The method of claim 1, wherein a first distance comprises a distance from the side edge to a reference point positioned in the colored pattern layer.

5. The method automatic document feeder of claim 4, wherein a second distance comprises a distance from the side edge to the reference point after the document is fed the feeding length to the second position.

6. The method of claim 5, wherein the slant value comprises a ratio of a difference value of the first distance and the second distance to the feeding length, wherein the feeding length further comprises a length sufficient to enable measuring of a slant value.

7. The method of claim 6, wherein the slant value is calculated by an electronic calculation device.

8. The method of claim 7, wherein the electronic calculation device comprises a software calculation program.

9. The method of claim 7, wherein the electronic calculation device further comprises a calculator in a computer.

10. The method of claim 4, wherein the reference point is positioned on a scan line of the scanning window.

11. The method of claim 1, and further comprising comparing the slant value with a preset value.

12. The method of claim 11, wherein the preset value comprises a value that is tested and provided for the document.

13. The method of claim 11, and further comprising scanning the document in response to the slant value being smaller than the preset value.

14. The method of claim 11, and further comprising terminating scanning in response to the slant value being larger than the preset value.

15. The method of claim 14, and further comprising taking the document out of the document feeder, and repeating said actuating the automatic document feeder, said capturing the first image of the document, said feeding the document the feeding length to the second position, said capturing the second image of the document, and said calculating the slant value by comparing the first image with the second image.

16. The method of claim 15, wherein said taking the document out of the document feeder further comprises manually taking the document out of the document feeder.

17. The method of claim 13, and further comprising setting off an alarm in response to the slant value being larger than the preset value.

18. A method comprising:
    actuating a document feeder in an optical scanner to place a document in a first position;
    capturing a first image while said document is in said first position;
    actuating the document feeder to feed the document into the optical scanner an appropriate length that is less than a total length of the document, to place said document in a second position;
    capturing a second image while said document is in said second position; and
    determining a slant value based, at least in part, on a comparison of the first image with the second image.

19. The method of claim 18, and further comprising arranging a colored pattern in or near a scanning window of the optical scanner.

20. The method of claim 19, wherein a color of a colored pattern is different from that of the document.

21. The method of claim 20, and further comprising positioning a first edge of the document between the scanning window and the colored pattern.

22. The method of claim 21, and further comprising measuring a first distance between the first edge and a reference point positioned in the colored pattern.

23. The method of claim 22, and further comprising measuring a second distance between the first edge and the reference point positioned in the colored pattern.

24. The method of claim 23, wherein the reference point is positioned on a scan line of the scanning window.

25. The method of claim 23, and further comprising determining the slant value based, at least in part, on a ratio of a difference between the first distance and the second distance to the appropriate length.

26. The method of claim 25 wherein the appropriate length comprises a length sufficient to determine the slant value.

27. The method of claim 18, wherein the slant value is calculated by an electronic calculation device.

28. The method of claim 27, wherein the electronic calculation device further comprises a software calculation program.

29. The method of claim 27, wherein the electronic calculation device comprises a calculator in a computer.

30. The method of claim 18, and further comprising comparing the slant value with a preset value.

31. The method of claim 30, wherein the preset value comprises a value that is tested and provided for the document.

32. The method of claim 30, and further comprising continuously scanning in response to the slant value being smaller than the preset value.

33. The method of claim 30, and further comprising terminating a scanning operation in response to the slant value being larger than the preset value.

34. The method of claim 33, and further comprising repositioning the document.

35. The method of claim 33, and further comprising setting off an alarm in response to the slant value exceeding the preset value.

36. The method of claim 18, wherein said actuating a document feeder in an optical scanner to place a document in a first position comprises automatically actuating the document feeder.

37. The method of claim 18, wherein said actuating the document feeder to feed the document into the optical scanner an appropriate length to place the document in a second position comprises automatically actuating the document feeder.

38. An optical scanning device, comprising:

a document feeder adapted to place a document in a first position, wherein the optical scanning device is adapted to capture a first image while the document is in the first position, the document feeder is further adapted to feed the document into the optical scanner a feeding length to place the document in a second position, wherein the feeding length is less than a total length of the document, and wherein the optical scanning device is further adapted to capture a second image while the document is in the second position, and further wherein the optical scanning device is adapted to determine a slant value based, at least in part, on a comparison of the first image with the second image.

39. The optical scanning device of claim 38, wherein the document feeder comprises a colored pattern positioned in an area corresponding to a scanning window of the optical scanner.

40. The optical scanning device of claim 39, wherein a color of the colored pattern is different from that of the document.

41. The optical scanning device of claim 40, wherein the document feeder is adapted to position a first edge of the document between the scanning window and the colored pattern.

42. The optical scanning device of claim 41, wherein the optical scanning device is adapted to measure a first distance between the first edge and a reference point positioned in the colored pattern.

43. The optical scanning device of claim 42, wherein the optical scanning device is further adapted to measure a second distance between the first edge and the reference point positioned in the colored pattern.

44. The optical scanning device of claim 43, wherein the reference point is positioned on a scan line of the scanning window.

45. The optical scanning device of claim 44, wherein the optical scanning device is further adapted to determine the slant value based, at least in part, on a ratio of a difference between the first distance and the second distance to the feeding length.

46. The optical scanning device of claim 45, wherein the feeding length comprises a length sufficient to determine the slant value.

47. The optical scanning device of claim 38, further comprising an electronic calculation device adapted to calculate the slant value.

48. The optical scanning device of claim 47, wherein the electronic calculation device further comprises a software calculation program.

49. The optical scanning device of claim 47, wherein the electronic calculation device comprises a calculator in a computer.

50. The optical scanning device of claim 38, wherein the optical scanning device is further adapted to compare the slant value with a preset value.

51. The optical scanning device of claim 50, wherein the preset value comprises a value that is tested and provided for the document.

52. The optical scanning device of claim 50, wherein the optical scanning device is adapted to continuously scan in response to the slant value being smaller than the preset value.

53. The optical scanning device of claim 50, wherein the optical scanning device is adapted to terminate a scanning operation in response to the slant value being larger than the preset value.

54. The optical scanning device of claim 53, wherein the optical scanning device is further adapted to set off an alarm in response to the slant value exceeding the preset value.

55. The optical scanning device of claim 38, wherein the document feeder comprises an automatic document feeder.

* * * * *

UNITED STATES PATENT AND TRADEMARK OFFICE
CERTIFICATE OF CORRECTION

PATENT NO.        : 7,457,012 B2
APPLICATION NO.   : 10/035516
DATED             : November 25, 2008
INVENTOR(S)       : Po-Hua Fang Page 1 of 1

It is certified that error appears in the above-identified patent and that said Letters Patent is hereby corrected as shown below:

At column 8, line 24, delete "of a colored" and insert -- of the colored --, therefor.

Signed and Sealed this

First Day of September, 2009

David J. Kappos
*Director of the United States Patent and Trademark Office*